(12) United States Patent
Tijssen et al.

(10) Patent No.: US 8,725,715 B2
(45) Date of Patent: May 13, 2014

(54) ENHANCED CONTENT AND SEARCHING FEATURES PROVIDED BY A LINKED-TO WEBSITE

(75) Inventors: Remon Tijssen, Mill Valley, CA (US); Tim Kukulski, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 332 days.

(21) Appl. No.: 12/770,183

(22) Filed: Apr. 29, 2010

(65) Prior Publication Data

US 2013/0198158 A1      Aug. 1, 2013

(51) Int. Cl.
*G06F 17/30* (2006.01)
(52) U.S. Cl.
USPC .......................................... 707/706; 758/765
(58) Field of Classification Search
USPC ................... 707/726, 706, 765, 758
See application file for complete search history.

(56) References Cited

U.S. PATENT DOCUMENTS

| | | | |
|---|---|---|---|
| 2008/0215416 A1* | 9/2008 | Ismalon | 705/10 |
| 2009/0192985 A1* | 7/2009 | Bolls et al. | 707/3 |
| 2010/0299201 A1* | 11/2010 | Thrasher | 705/14.49 |
| 2011/0276560 A1* | 11/2011 | Costello | 707/708 |
| 2011/0313862 A1* | 12/2011 | Ramer et al. | 705/14.64 |

* cited by examiner

*Primary Examiner* — Neveen Abel Jalil
*Assistant Examiner* — Jagdish Pandya
(74) *Attorney, Agent, or Firm* — Kilpatrick Townsend & Stockton LLP (57) ABSTRACT

Methods and systems are disclosed that allow a linked-to web page to be provided using information about a linked-from web page. The linked-to web page, for example, may be provided with enhanced content, additional content, suggestion features, or searching features. Certain of the methods are useful in the context of a user using a search engine web page to search for and link to other web pages. An exemplary method can be performed by a server that provides such a linked-to web page. The server receives a request to provide the linked-to web page and parses the request to identify information, such as, search terms that were entered on the search engine web page. The server can use the search terms or other information associated with the linked-from web page to determine what content should be provided or how it should be provided for the linked-to web page.

21 Claims, 7 Drawing Sheets

ENHANCED CONTENT AND SEARCHING FEATURES PROVIDED BY A LINKED-TO WEBSITE

FIELD

This disclosure relates generally to computer software that runs, displays, provides, shares, or otherwise uses electronic content.

BACKGROUND

The term "website" is used herein to refer to a collection of related web pages, images, videos, rich Internet applications, or other digital assets that are addressed relative to a common Uniform Resource Locator (URL) domain name or Internet Protocol (IP) address. A website is generally hosted by at least one web server, accessible via a network such as the Internet or private local area network. All publicly accessible websites collectively make up the World Wide Web. The term "web page" is used herein to refer to a document or other electronic content that is provided to and interpreted by a user's web browser or other application to display content, for example, according to the document's instructions. Users can access a web page directly, by entering some or all of a URL directly in a web browser. Web browsers use the URL to resolve a domain name and ultimately identify an IP address from which the content specified by the user-entered URL can be retrieved.

There are also various ways to search for electronic content. Numerous search engine websites are available on the World Wide Web, for example, and allow users to enter one or more search terms to search for web pages containing the searched for content. Such search engines generally store information about many web pages including words from titles, headings, and elsewhere in the content, and/or from the metadata of the web pages. Such information can be stored in an index database. When a user enters a search, the search engine examines its index and provides a listing of best-matching web page results according to its criteria, usually with a short summary containing each result's title, some of its text, and a link to the web page.

While search engines employ various techniques using entered search terms to try to identify web pages containing the content for which a user is searching, users often have to search amongst many of the listed search results or revise their search before finding the searched for content. To facilitate more refined searching, many search engines support the use of multiple search terms and the joining of such terms using Boolean operators such as "AND" and "OR" to allow a user to refine and extend a search. Some search engines provide a proximity search feature which allows a user to define the distance (i.e., the number of intermediate words or characters) between keywords. The usefulness of a search engine depends on the relevance of its results to the user's search. While many web pages may include particular words or phrases, some web pages may be more relevant to a user's particular search than others. Search engines vary widely with respect to determining which pages are the best matches and ordering results.

Figure 1:
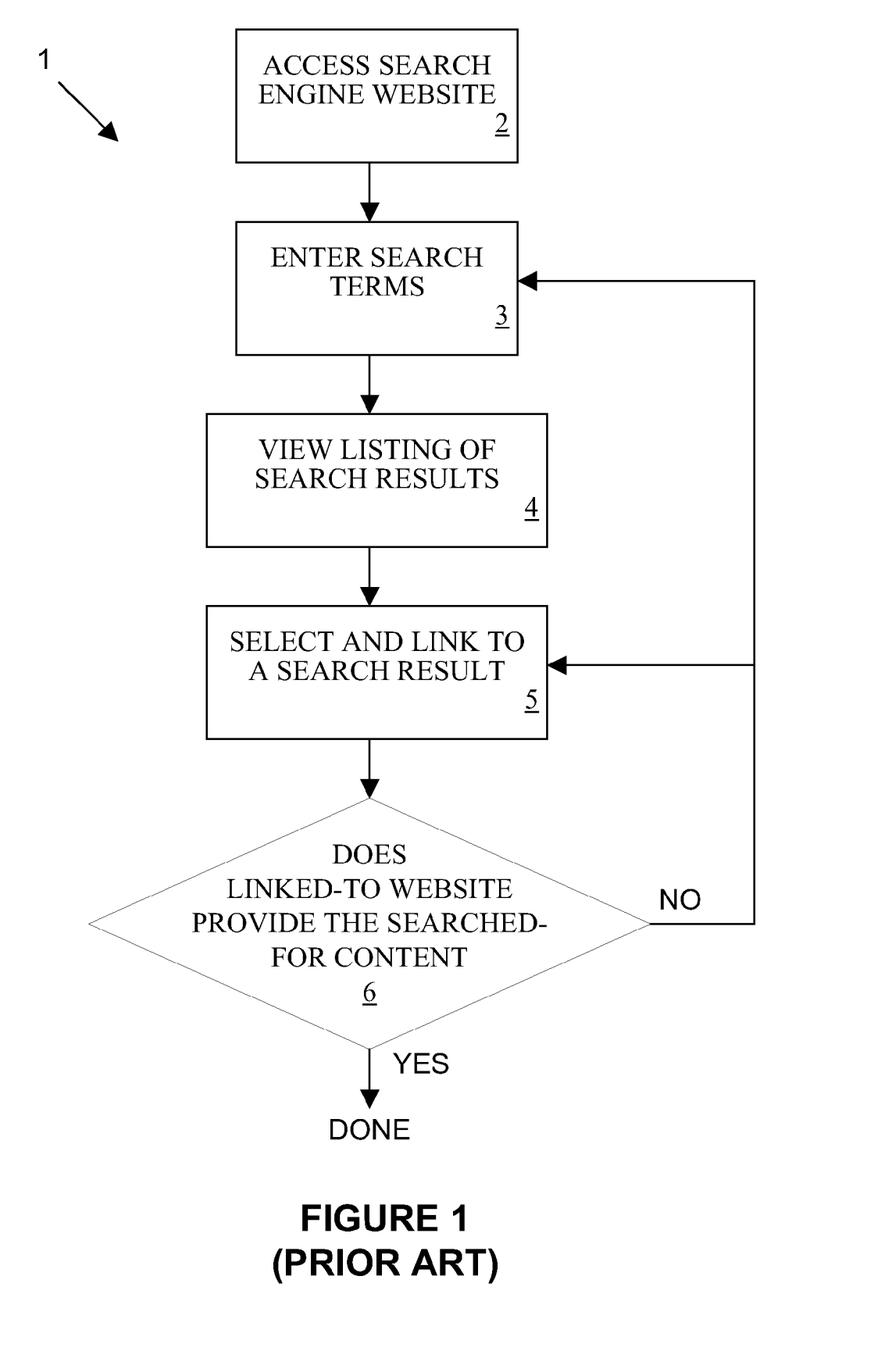
FIG. 1 is an exemplary flowchart illustrating actions that an exemplary user takes to search for and access desired web content using conventional web technology.

FIG. 1 is an exemplary flowchart 1 illustrating actions that an exemplary user takes to search for and access desired web content using conventional web technology. In block 2, the user accesses a search engine website. In block 3, the user enters one or more search terms and initiates a search. In block 4, the user views a listing of search results that were determined by the search engine using the search terms. In block 5, the user selects a search result and accesses the web page identified by that search result. The user then explores that linked-to web page and possibly other web pages provided on the associated linked-to website.

As shown in decision block 6, if the linked-to website provides the searched for content the process ends since the user has found the searched for content. If the user has not found the searched for content, the user returns to the search engine results. For example, many web browsers allow a user to select a "BACK" command that accesses previously accessed web pages. The user may use such a command to backtrack until the search engine results are again displayed in the web browser. The process then returns to block 3 or 5 where the user will either enter or revise search terms (block 3) or select and access another search result from amongst those displayed on the search engine's results (block 5).

This exemplary process and other similar user workflows are typical when a user is searching for web content. Such processes can involve an undesirable amount of back and forth navigation between a search engine website and the individual search result websites. Generally, there is a need for more efficient, better informed, and otherwise improved techniques for searching for and accessing web content.

SUMMARY

Methods and systems are disclosed that allow a linked-to web page to be provided using information about a linked-from web page. The linked-to web page, for example, may be provided with enhanced content, additional content, suggestion features, or searching features. Certain of the methods are useful in the context of a user using a search engine web page to search for and link to other web pages. An exemplary method can be performed by a server that provides such a linked-to web page. The server receives a request to provide the linked-to web page and parses the request to identify information, such as, search terms that were entered on the search engine web page. In a specific example, the server parses the request to identify a URL for the linked-from search web page to identify search terms entered on that web page. The server can use the search terms or other information associated with the linked-from web page to determine what content should be provided or how it should be provided for the linked-to web page.

In certain embodiments, a server provides a linked-to web page that itself displays search features, for example, to allow the user to search within other web pages provided by the same website. The linked-to web page may include a search interface that displays and allows editing of the search terms that were identified from the linked-from web page as well as a search results listing of results specific to the website. A search interface may display graphics, such as Venn diagrams, that facilitate refining or expanding the search results. A search interface may also recommend one or more of the search results based at least in part on information about other users searching with similar search terms, e.g., based on recognizing that other users using similar search terms ultimately found that a particular web page contained the searched-for content or based on such prior users ratings with respect to the search results.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Among other things, embodiments disclosed herein allow a website to provide improved web pages and better satisfy users accessing the website. When a web page is requested, the content that is provided to the requesting party can be tailored to the user. In certain embodiments, this is accomplished by inferring the requesting party's preferences or intentions from information about a previous web page that was used by the requesting party to link to (i.e., request) the web page.

As much as ninety percent or more of a website's user traffic may come from search engine web pages. Conventional web pages do not utilize this context and are generally provided in the same way regardless of how the requesting party ended up at the particular web page. Rather than ignoring such potentially valuable information, embodiments of the present invention determine information about a linked-from web page to customize, enhance, or supplement content provided as a requested web page.

In the context of a user using a search engine web page to search for and link to other web pages, certain embodiments identify information about the search engine web page, e.g., the language of the web page's text or user inputted information such as search terms, to provide a linked-to web page. A server, for example, may parse a request to identify information, such as, search terms that were entered on a search engine web page that was then used to request (i.e., link to) a search result. In a specific example, the server parses the request to identify a URL for the linked-from search web page to identify search terms entered on that web page. The server can use the search terms or other information associated with the linked-from web page to determine what content should be provided or how it should be provided for the linked-to web page. Search terms entered on such a previously-used web page can be used as an indication of what the user is looking for. Content for a linked-to web page can thus be customized or otherwise enhanced using such information.

The following example illustrates a specific context in which a linked-to web page can be enhanced. In this example, a user uses a search engine website to search for web pages using three search terms: a company name, a product name, and a feature. The user hopes to identify content that explains how to use the specified feature of the named product that is offered by the named company. From the displayed search results, the user selects to link to a web page provided at the company's website that generally describes the product. The user returns to the search engine and selects another of the search results to link to. Eventually, the user finds the content that best satisfies the user's needs, which in this example, could be a web page that includes a .pdf file containing a "how to" article available on the company's website.

One exemplary embodiment allows a website, such as the company's website in the preceding example, to provide a more efficient or otherwise improved user experience. When the user selects the first result and is linked to the general product web page at the company's website, the company's website server responds by providing additional information. For example, the content for the linked-to web page may be enhanced to include a side bar, for example, on the right hand side, that recommends other content to the user. For example, it may recommend the web page that includes the .pdf file of the "how to" article and indicate that that web page was found to be useful or highly-rated by other users that used similar search terms.

Figure 2:
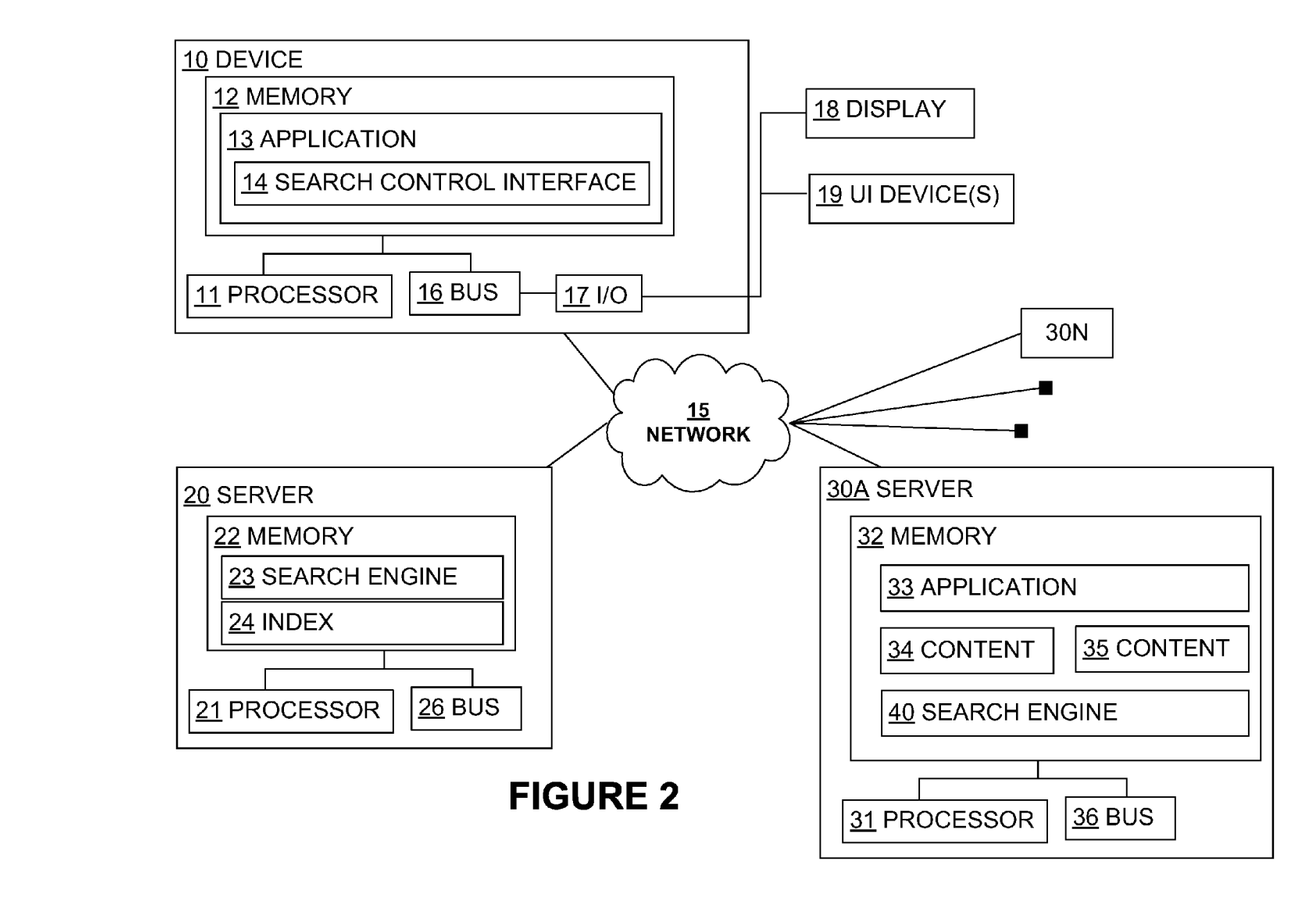
FIG. 2 depicts an exemplary environment for providing a linked-to web page using information about a linked-from web page.

FIG. 2 depicts an exemplary environment for providing a linked-to web page using information about a linked-from web page. The methods and systems disclosed herein are also applicable on other computing systems and environments. The environment shown in FIG. 2 comprises a wired or wireless network 15 connecting various devices 10, 20, 30A-N. The network 15 shown comprises the Internet. In other embodiments, other networks, intranets, or combinations of networks may be used. Alternative configurations are possible.

Exemplary devices 10, 20, 30A-N are respectively used as special purpose computing devices to provide specific functionality offered by their respective applications. As is known to one of skill in the art, applications, such applications 13, search engine application 23, and application 33 may be resident in any suitable computer-readable medium and execute on any suitable processor. For example, as shown the device 10 comprises a computer-readable medium such as a memory 12 coupled to a processor 11 that executes computer-executable program instructions and/or accesses information stored in memory 12. Similarly, device 20 comprises a computer-readable medium such as a memory 22 coupled to a processor 21 that executes computer-executable program instructions and/or accesses information stored in memory 22. And also similarly, device 30A comprises a computer-readable medium such as a memory 32 coupled to a processor 31 that executes computer-executable program instructions and/or accesses information stored in memory 32. Such processors 11, 21, 31 may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A device may also comprise functionality, such as I/O features 17 for connecting to a number of external or internal devices such as a mouse, a CD-ROM, DVD, a keyboard, a display, audio speakers, or other input or output devices. As an example, device 10 is shown with a display 18 and various user interface devices 19. A bus, such as bus 16, bus 26, or bus 36, will typically be included in a device as well.

Server devices 30A-30N generally provide electronic content for the web pages offered on websites. Each website may have web page content that is provided by one or more of the server devices, 30A-30N. Web page content is made available for access and use on the device 10 and server 20 and possibly on other devices (not shown).

Server 20 includes a search engine application 23 and an index 24. The search engine application 23 is an application that uses the index 24 to identify and provide search results in response to search requests. The index 24 may contain information about content stored or otherwise available from other devices, such as content available on servers 30A-N. As a more specific example, server 30A comprises exemplary pieces of content 34, 35 and the index 24 on server 20 contains information about each of these exemplary pieces of content 34, 35.

In one exemplary embodiment, a search is initiated from device 10, for example, from application 13 executing on device 10. Application 13 may be a web browser displaying a web page received from a remote server, such as one received from server 20 or one of servers 30A-N. Application 12 may receive a web page from server 20 that provides a search feature, i.e., a search engine website. In one example, the application 13 is a web browser that displays a search engine web page received from server 20, and that receives input from a user, for example, when a user enters one or more search terms and selects a search command. This input is used to initiate a search through network 5 to server 20 for processing by search engine application 23. Various searching techniques can be used by the search engine application 23 and such techniques will typically identify one or more web page search results. The search engine application may then return a search engine web page that includes a list of search result web pages, including links that allow the user to request those individual web page search results from their respective providing servers, e.g., one or more of servers 30A-N.

A search engine web page that includes a list of search result web pages is an example of a linked-from web page. Other examples of linked-from web pages include, but are not limited to, other types of search web pages, search result web pages, recommendation engine web pages, non-searching web pages, and, generally, may include any web page that provides a link to one or more other web pages in circumstances in which a linked-to web page can identify information about the linked-from web page.

In the context of this exemplary search using search engine 23, the application 13 on device 10 may display the one or more search results received in response to the search request. When a user of device 10 selects a link for a search result, an appropriate providing server is identified, for example, by resolving a given link's domain name to an IP address. A request is sent to the identified providing server for the linked-to web page. For example, the request may be sent to server 30A.

Server 30A can respond to such a request by selecting content to provide to device 10 for display as the linked-to web page. In other circumstances, information about the linked-from web page may be unavailable and the web page's standard content may be provided. For example, server 30A may simply send content 34, which may be an HTML file, in response to the request for a web page. Such a standard page may be provided in some circumstances in which information is obtainable or identified about a linked-from web page. In other circumstances, it may be appropriate to enhance, add to, delete from, condense, or otherwise provide content different from the content that would be provided absent information about the linked-from web page. An application 13 may, in certain embodiments, determine whether to provide different content based on whether information about a linked-from web page is available and/or based on other factors, such as, the nature of the available information, the identity of the requester, preferences of the requester, legal restrictions, etc.

In the context of this exemplary request initiated by a link from a link on an exemplary search results web page provided by server 20, the server 30A receives the request to provide a linked-to web page to device 10 and a content selection application 33 uses information in the request to determine the search term or terms that were used in the search on that linked-from web page. In a specific example, the server 30A parses the request to identify a URL for the linked-from search web page to identify search terms used on the linked-from web page. The server 30A then determines content to provide as the linked-to web page using the one or more search terms, wherein the provided content varies depending on the one or more search terms and provides the linked-to web page in response to the request.

A linked-to web page may be provided with enhanced content, additional content, suggestion features, or searching features. For example, based on particular search terms being identified, a content selection application 33 may determine to send both content 34 and content 35 for display as the linked-to web page rather then just sending content 34. To provide searching features, for example, a content selection application 33 may determine to include a search control interface 14, which may be provided with an initial set of search results identified based on the identified search terms. Exemplary techniques for implementing inclusion of such a search interface, involves using a search engine application 40 on server 40 that searches the World Wide Web, a sub-set of it, only a particular website's web pages, databases offering information not available on the World Wide Web, and/or any other suitable sources of information and provides results for use in the search interface that is provided as part of a linked-to web page or otherwise to enhance a user's experience with the website. Searching can be facilitated using indexing, database querying, and any other suitable searching technique or combination of techniques. Searching may involve accessing content rating and other information, for example, that associates, correlates, or rates particular pieces of content with particular search terms and using such information to identify search results and/or make recommendations to a user with respect to which search results are most likely to provide searched for content. Such associations, correlations, and ratings may be based on information about prior interactions with a website by the particular user and/or by other users.

It will be understood that the above examples are provided merely to illustrate an exemplary context for certain embodiments. Other system configurations may also be used. For example, while the servers 20, 30A-N are depicted as single devices in FIG. 2, a server performing the above functions and other functions described herein can be distributed across multiple devices. Thus, functions performed by a server can be, but do not need to be, performed on a single computing device. In one example, a content selection application 33 and a search engine application 40 are physically located on different computing devices. Similarly, content used for a single web page or multiple web pages may be stored on one or many physical storage devices.

Figure 3:
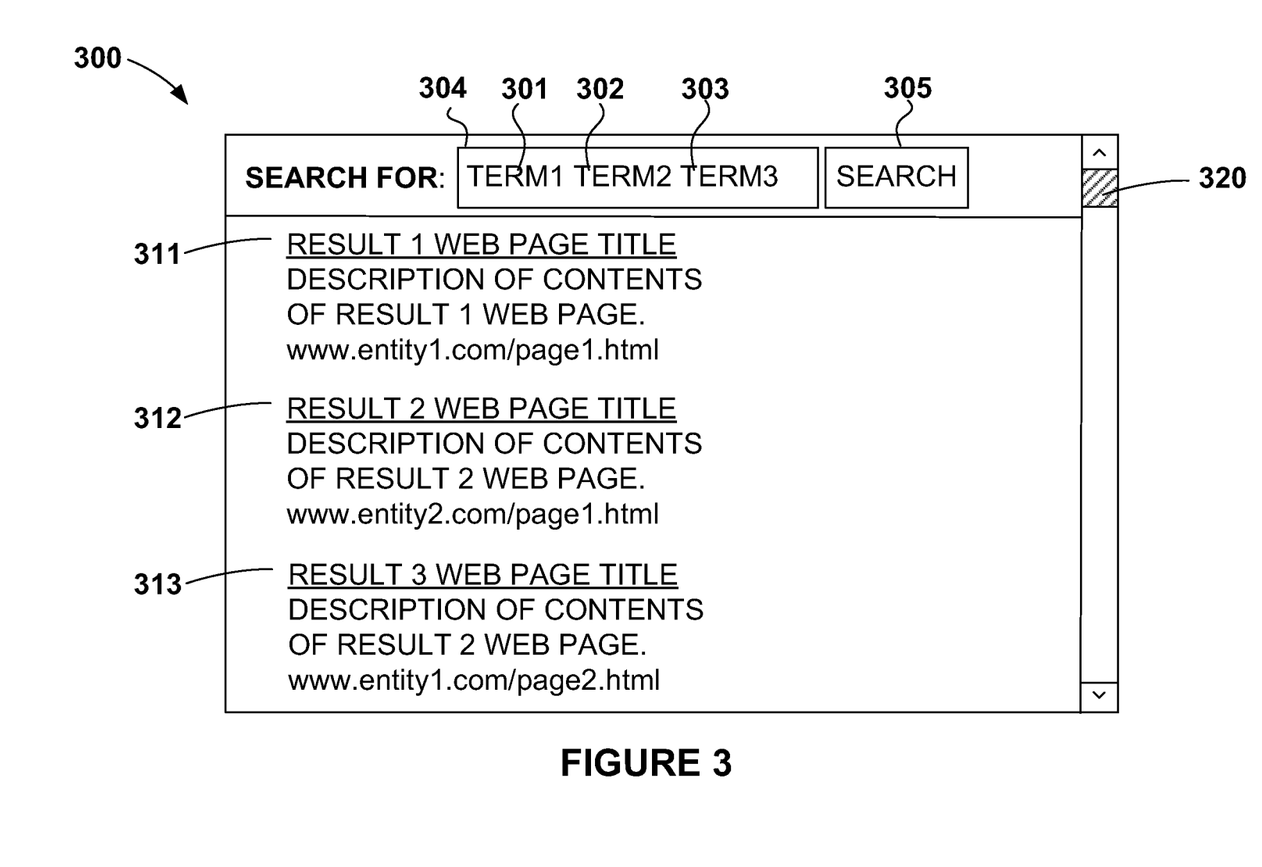
FIG. 3 illustrates the displayed contents of an exemplary linked-from search engine web page.

FIG. 3 illustrates the displayed contents 300 of an exemplary linked-from search engine web page. This web page is an example of a search engine results web page that could be provided by the exemplary search engine application 20 of FIG. 2. The displayed contents 300 includes a search term entry field 304 in which three search terms are displayed: a first search term "TERM1" 301, a second search term "TERM2" 302, and a third search term "TERM3" 303. Those search terms can be edited within the search term entry field 304 and a new search launched with a subsequent selection of the search button 305.

The results shown in the displayed contents 300 of FIG. 3 include a first result 311 that includes a link labeled "RESULT 1 WEB PAGE TITLE," a description that includes "DESCRIPTION OF CONTENTS OF RESULT 1 WEB PAGE," and a URL that includes "www.entity1.com/page1.html." A second result 312 includes a link labeled "RESULT 2 WEB PAGE TITLE," a description that includes "DESCRIPTION OF CONTENTS OF RESULT 2 WEB PAGE," and a URL that includes "www.entity2.com/page1.html." A third result 313 includes a link labeled "RESULT 2 WEB PAGE TITLE," a description that includes "DESCRIPTION OF CONTENTS OF RESULT 2 WEB PAGE," and a URL that includes "www.entity1.com/page2.html." Additional results (not shown) are also included and are accessible using scroll bar 320. The URL's of the first result 311 and the third result 313 indicate that these results are both associated with the same domain name "entity1" within the top-level domain "com." The associated exemplary web pages, i.e., "page1.html" and "page2.html" are provided as part of the same website.

Using conventional techniques, a user would generally navigate the web browser back and forth between the search results page and the individual results, for example, by linking to the individual result web pages and then selecting a "back" browser command to return to the displayed content 300 of the search result web page shown in FIG. 3.

An exemplary results web page such as the one for which displayed contents 300 is illustrated in FIG. 3 may itself have a URL that identifies the search terms used in finding the search results. As one example, a search using search terms "TERM1 TERM2 TERM3" on the GOOGLE search engine provides a search results web page with the following URL:
    http://www.google.com/search?q=TERM1+TERM2+TERM3&sourceid=ie7&rls=com.microsoft:en-US&ie=utf8&oe=utf8&rlz=1I7GGLL_en As another example, a search using search terms "TERM1 TERM2 TERM3" on the Ask.com® search engine provides a search results web page with the following URL:
    http://www.ask.com/web?qsrc=2417&o=0&l=dir&q=TERM1+TERM2+TERM3

As another example, a search using search terms "TERM1 TERM2 TERM3" on the YAHOO!® search engine provides a search results web page with the following URL:
    http://search.yahoo.com/search?ei=utf-8&fr=slv8-twc&p=TERM1%20TERM2%20TERM3&type=

When a user selects a link linking to a result on a search results web page, a request is sent to retrieve the linked-to web page from an appropriate location. In the context of an HTTP protocol-based request for a web page from a web server, a "referrer" field of such a request may be populated with the URL of the linked-from web page. As shown in the above exemplary search result web pages, such a URL may include the search terms that were used on the linked-from search engine results web page. The server receiving the requests can parse the URL in the referrer field, depending on the particular search engine's semantic format or formats, to identify the search terms. Once identified, the server can use the one or more search terms to provide the linked-to web page, as an example, with enhanced content, additional content, suggestion features, searching features, or otherwise use the search terms to enhance the user's experience with the website.

Figure 4:
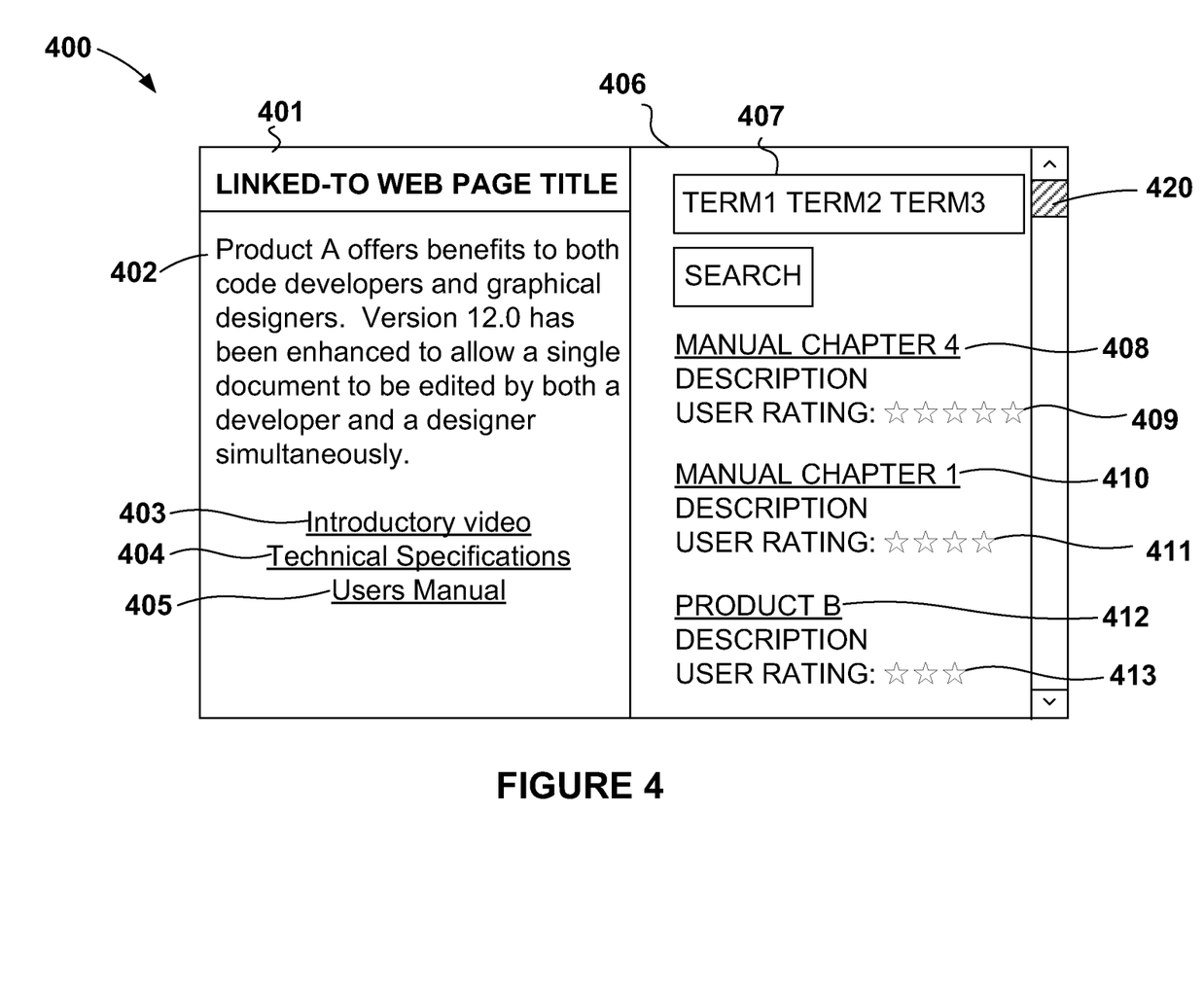
FIG. 4 illustrates displayed contents of an exemplary linked-to web page, including an exemplary search interface.

FIG. 4 illustrates displayed contents 400 of an exemplary linked-to web page, including an exemplary search interface 406. The displayed contents include content that are provided as the web page in other circumstances (i.e., when not linked-to from a search engine) such as title 40, text content 402, and links 403, 404, and 405. However, using the search terms identified from a linked-from web page, e.g., from the linked-from web page described with respect to FIG. 3, the displayed contents 400 of the exemplary linked-to web page are provided to include an exemplary search interface 406. This search interface 406, in this example, includes a search term field 407 in which the identified search terms, i.e., "TERM1," "TERM2," and "TERM3," are included, as well as, search results 408, 410, 412 obtained using those search terms. In this example, the search results are limited to web pages that are also provided by the website providing the linked-to web page. In addition to links and descriptions presented for the search results, the search results also show ratings, 409, 411, and 413 that illustrate associations, correlations, or user-entered rating values for particular pieces of content with respect to particular search terms. Such ratings or other graphical indicia can be used to make recommendations to a user with respect to which search results are most likely to provide searched for content. Such associations, correlations, and ratings may be based on information about prior interactions with a website by the particular user and/or by other users. Scroll bar 420 allows a user to scroll to view additional results.

Figure 5:
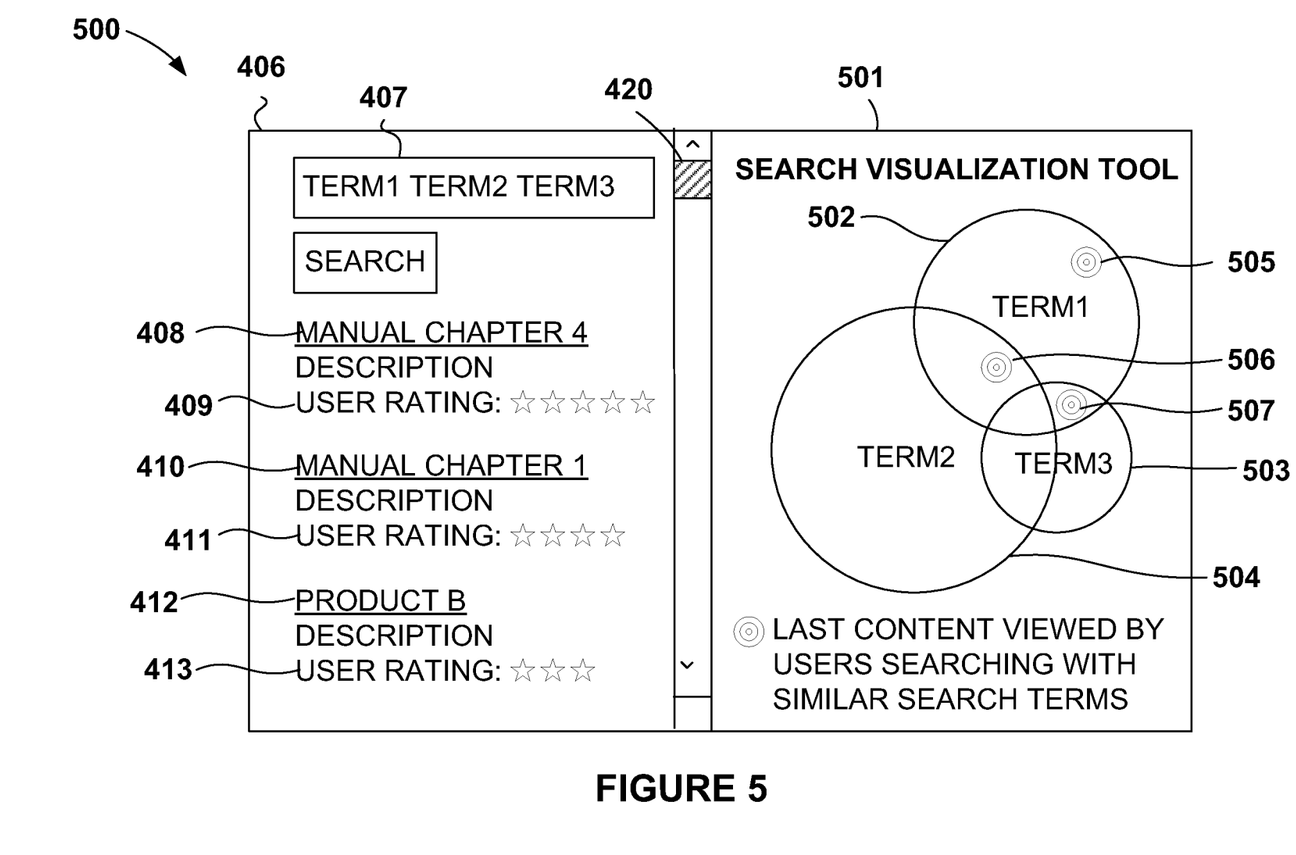
FIG. 5 illustrates displayed contents that includes the exemplary search interface of FIG. 4 and an exemplary search visualization feature.

FIG. 5 illustrates displayed contents 500 that includes the exemplary search interface 406 of FIG. 4 and a search visualization feature 501. The search visualization feature 501 of FIG. 5 can provide a useful graphical representation that provides a user with information about how search results would change if the user eliminates certain search terms. Such information can help a user refine their search and ultimately identify the location of searched for content.

The search visualization feature 501 provides a tool that displays a Venn diagram with a circle 502, 503, 504 for each of the search terms. An aspect of each circle facilitates visual recognition of the quantity of search results associated with the particular search term. For example, the size of a circle may represent the number of associated results. The areas overlapped by two or more circles represent the results associated with all of the associated search terms. In an alternative embodiment, numbers are included within the circles in addition to or as an alternative to using the size of the circles to represent quantity of results. For example, each circle can include a number that identifies the number of results that a search with only the associated search term would yield. Areas common to multiple circles could similarly include a number that identifies the number of results that a search with the associated search terms would yield.

The search visualization feature 501 may be interactive. For example, a user may move a mouse-controlled cursor over different portions of the diagram to change the search results displayed in search interface 406. For example, clicking in an area of the diagram only surrounded by the "TERM2" circle 504 would change the results to display all of the results for a search involving only "TERM2." While clicking in an area of the diagram surrounded by the "TERM2" circle 504 and the "TERM3" circle 503 but not surrounded by the "TERM1" circle 502 would change the results to display all of the results for a search involving only "TERM2" and "TERM3."

FIG. 5 further illustrates several graphical indicators 505, 506, and 507 that identify search results determined to be responsive to other users' searches involving similar search terms. The locations of the graphical indicators 505, 506, and 507 within the diagram with respect to the circles 502, 503, 504 provides an indication as to which search terms a recommended result has been found responsive. As an example, graphical indicator 506 was found responsive to users searching for "TERM1" and "TERM2" or similar terms. Graphical indicators 507 was found responsive to users searching for "TERM1" and "TERM3" or similar terms. Results can be identified as "responsive" or otherwise associated with, correlated with, or recommended as illustrated by such a graphical indicator 505, 506, and 507 based on information about prior interactions with a website by the particular user and/or by other users. Users may have, for example, provided specific ratings with respect to individual web pages, completed surveys, or otherwise provided feedback from which such information can be harvested. Statistics with respect to time spent on particular pages, final pages viewed before leaving a website, and other information about user interaction can be used.

Features of embodiments disclosed herein can be used to supplement or otherwise be used in combination with user interaction tracking and suggestion features. For example, existing software technologies may be used to track how users interact within the web pages offered by a website. Based on how a given user interacts, an interaction tracking and suggestion feature on a website, may provide recommendations to a user to direct the user to particular content. Embodiments disclosed herein can provide additional information to such a user interaction tracking and suggestion feature. For example, information about a linked-from web page external to the website can be provided to enhance the suggestions. As a specific example, search term information used at the linked-from web page can be provided to improve the suggestions presented to the user. Certain embodiments extend the information tracking capabilities so that user interaction on a linked-from web page, e.g., the entering of search terms on a separate search web page, is also used in determining suggestions for a user. The "click stream" that is tracked can effectively start at the outside search engine rather than at the linked-to web page of the website.

Figure 6:
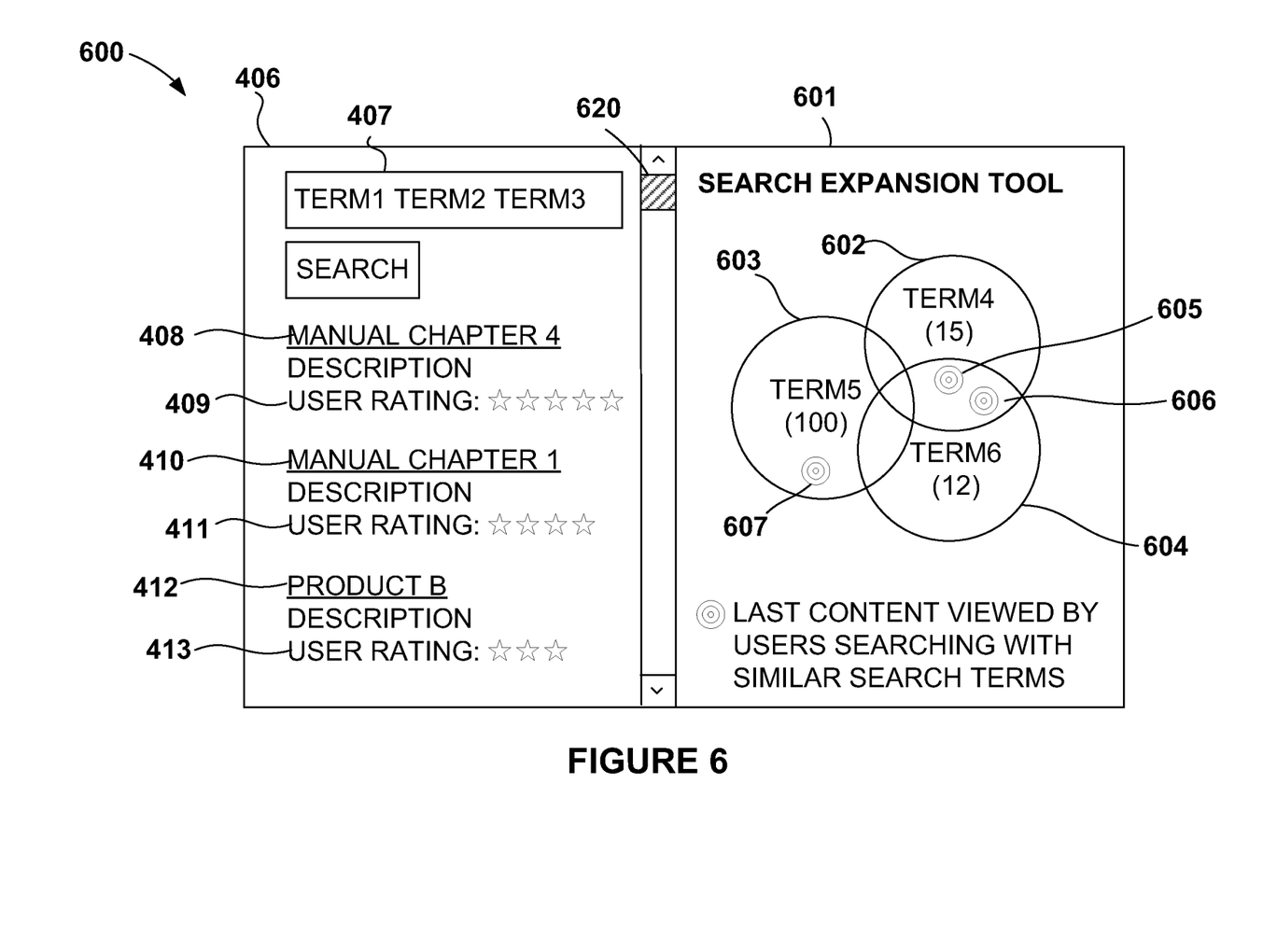
FIG. 6 illustrates displayed contents that includes the exemplary search interface of FIG. 4 and an exemplary search expansion feature.

FIG. 6 illustrates displayed contents 600 that includes the exemplary search interface 406 of FIG. 4 and an exemplary search expansion feature 601. The search expansion feature 601 of FIG. 6 can provide a useful graphical representation that provides a user with information about how search results would change if the user added one or more suggested additional search terms. Such information can help a user refine their search and ultimately identify the location of searched for content.

The search visualization feature 601 provides a tool that displays a Venn diagram with a circle 602, 603, 604 for each of the several suggested search terms: "TERM4," "TERM5," and "TERM6." Additional search terms can be identified by identifying search terms that result in the highest number of highly-rated search results. Additional search terms can also be identified using the existing search terms. For example, synonyms, trade names of, other terms related to one or more of the existing search terms can be identified based on recognition that such additional terms result in more numerous and/or higher-rated search results. An aspect of each circle, in this case a displayed number, facilitates visual recognition of the quantity of search results associated with the particular recommended search term. In other embodiments, such a search visualization feature 601 will also display circles or other graphics for existing search terms together with the graphics for the suggested search terms to illustrate and/or provide a mechanism for changing a search by both eliminating existing search terms and/or adding suggested search terms.

FIG. 6 further illustrates several graphical indicators 605, 606, and 607 that identify search results determined to be responsive to other users' searches involving similar search terms. The locations of the graphical indicators 605, 606, and 607 within the diagram with respect to the circles 602, 603, 604 provides an indication as to which additional search terms a recommended result has been found responsive.

Figure 7:
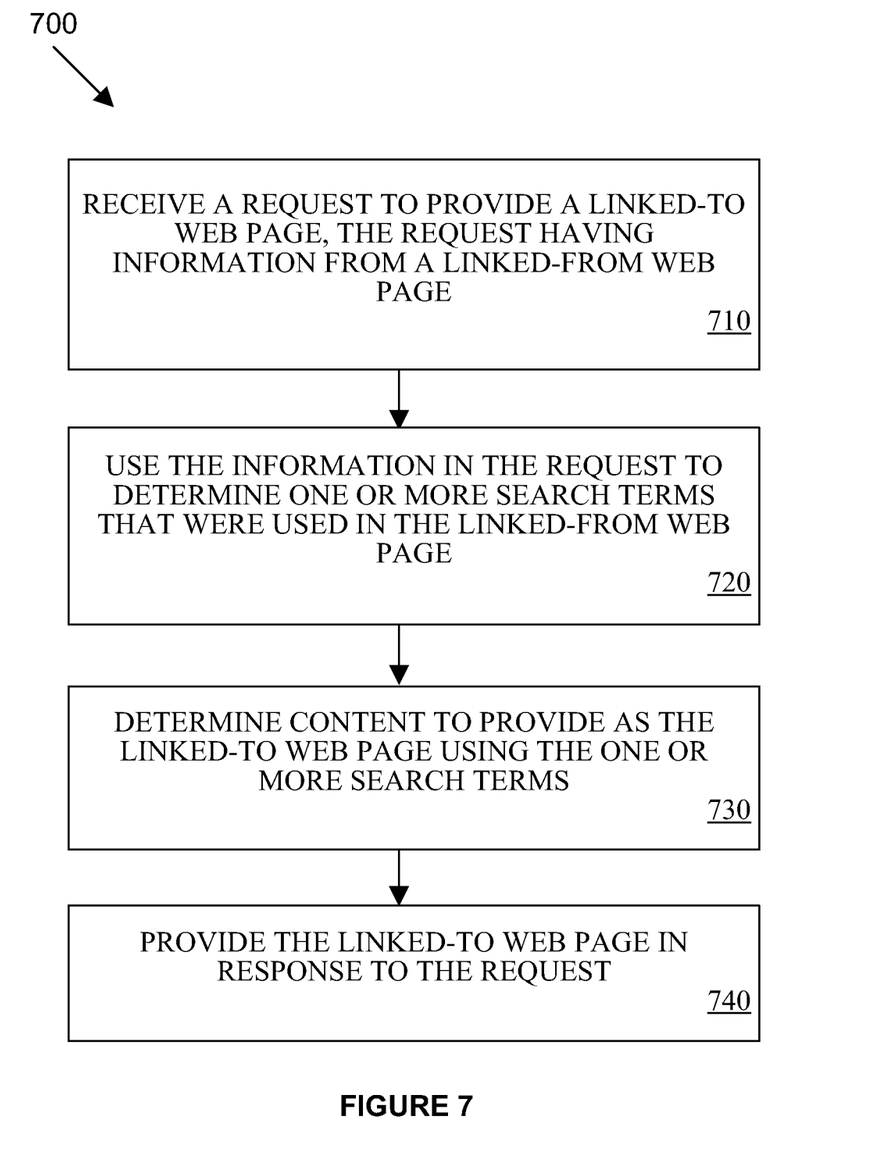
FIG. 7 is a flow chart of an exemplary method of providing a linked-to web page using search term information from a linked-from web page.

FIG. 7 is a flow chart of an exemplary method 700 of providing a linked-to web page using search term information from a linked-from web page. Such a method may be accomplished by a server such as server 30A shown in FIG. 2, although a variety of additional computer contexts may be implemented as may be appropriate. Examples of a linked-to web page include, but are not limited to, an HTML document, a pdf document, a rich Internet application, or a video.

As shown in block 710, the exemplary method 700 involves receiving a request to provide a linked-to web page, the request having information from a linked-from web page. For example, a link on a linked-from web page may have been selected to initiate the request. A request need not be received directly from a user or a user's device. A request may be initiated by a user interaction on a computing device or by any other manual or automatic initiation mechanism and may initiate one or more electronic messages sent through one or more networks such as network 15 of FIG. 2 and ultimately arrive at a server or other device that will determine what to provide in response to the request. Information provided in the request may be used to determine that the linked-from web page was a search engine web page.

The exemplary method 700 further involves using the information in the request to determine one or more search terms that were used in or otherwise associated with the linked-from web page, as shown in block 720. For example, such search terms may have been entered into a search term field by a user interacting with a linked-from search engine website such that the user views a results web page listing one or more search results and selected to link to the linked-to web page by selecting one of those search results. The information in the request used to determine the one or more search terms associated with the linked-from web page may comprises a URL associated with the linked-from web page. More specifically, the information in the request may be found at least in part in an HTTP referrer field in an HTTP header.

The exemplary method 700 further involves determining content to provide as the linked-to web page using the one or more search terms, as shown in block 730. The determined content can generally vary depending on the one or more search terms. Determining content may involve determining to highlight terms, add content, delete content, hide or collapse content, or otherwise change the presentation of content to make it more useful for the user based on the assumption that the identified search terms are indicative of the type of content that the user is seeking. More specific examples include, but are not limited to, selecting an extra feature to include as part of the linked-to web page, determining to highlight instances of the one or more search terms, determining to collapse or hide features, and selecting a state of a rich Internet application or video other than the initial state. Determining content may involve navigating, e.g., deep linking, directly to a particular web page, web page portion, or content item.

Determining content to provide as the linked-to web page can involve identifying search results to display in the linked-to web page. Such search results can be identified in a search that uses the one or more search terms to search for other web pages that are part of a same website as the linked-to web page. The linked-to web page may thus comprise a search interface or other feature that displays the search results in a search results listing or otherwise. Such a search interface may be interactive, receiving input to refine the search or commands to navigate to individual results. A search interface may display user ratings for the search results.

A search interface may display a Venn diagram illustrating how eliminating one or more of the search terms would change the search results. User interaction with the Venn diagram may change which search results are displayed in the search results listing. Additional graphics may be used to illustrate to which of the search terms one or more suggested search results are associated. Such suggested search results can be identified, for example, based at least in part on information about other searches involving similar search terms. Additionally or alternatively, a search interface may display a Venn diagram illustrating how suggested search terms would narrow the search results.

Determining content to provide as the linked-to web page using the one or more search terms may involve identifying web pages that are part of a same website to recommend. Such recommendations may be based at least in part on the one or more search terms, on information about other searches involving similar search terms, and/or by tracking user interaction with the website.

The exemplary method 700 further involves providing the linked-to web page in response to the request, as shown in block 740. This may involve transmitting a document such as an HTML document for delivery to a requesting user device, such as, for example, device 10 shown in FIG. 2.

A system employing exemplary method 700 can track useful information and compile information associated with multiple users. For example, such a system may identify trends such as correlations between certain search engine search terms and the purchase of certain products or services offered on a website. Such correlations can be used to provide suggested search results and/or otherwise make suggestions to later users searching with similar search terms or search term combinations.

Embodiments disclosed herein can be particularly useful in circumstances in which search terms are specific to a corporate entity or its brand named products and services. Search terms may identify a product and search terms suggestive of features that can be used to direct the user directly to or otherwise provide recommendations that help the user more easily navigate to particular product catalog content or product specific reference materials. Embodiments are also useful in a variety of other contexts.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   receiving a request to provide a linked-to web page, wherein receiving the request comprises receiving a user-initiated selection of a link on a linked-from web page, wherein the linked-from web page comprises search results of a search based on one or more search terms, the linked-from web page comprising the link to the linked-to web page corresponding to a result of the search, wherein the request comprises information from the linked-from web page;
   using the information in the request to determine the one or more search terms associated with the linked-from web page;
   determining content to provide as the linked-to web page using the one or more search terms, wherein the provided content varies depending on the one or more search terms, wherein the content comprises a search tool identifying the one or more search terms and a new search term different from the one or more search terms and the linked-to web page provides new search results based on a new search using the one or more search terms and the new search term; and
   providing the linked-to web page in response to the request.

2. The computer-implemented method of claim 1 wherein determining content to provide as the linked-to web page comprises identifying the new search results to display in the linked-to web page, and wherein the linked-to web page comprises a search interface that displays the new search results in a search results listing and receives input to refine the new search.

3. The computer-implemented method of claim 2 wherein the search interface displays user ratings for the new search results.

4. The computer-implemented method of claim 2 wherein the one or more search terms comprise multiple search terms, and the search interface displays a Venn diagram illustrating how eliminating one or more of the search terms would change the new search results, wherein the Venn diagram comprises a circle for each of the search terms, wherein user interaction with the Venn diagram changes which new search results are displayed in the search results listing.

5. The computer-implemented method of claim 4 wherein the Venn diagram comprises graphics illustrating to which of the search terms one or more suggested search results are associated, wherein suggested search results are identified based at least in part on information about other searches involving similar search terms.

6. The computer-implemented method of claim 2 wherein the search interface displays a Venn diagram illustrating how suggested search terms would narrow the new search results, wherein the Venn diagram comprises a circle for each of the suggested search terms, wherein user interaction with the Venn diagram changes which new search results are displayed in the search results listing.

7. The computer-implemented method of claim 1 wherein determining content to provide as the linked-to web page comprises one or more of:
   selecting an extra feature to include as part of the linked-to web page;
   determining to highlight instances of the one or more search terms;
   determining to collapse or hide features; and
   selecting a state of a rich Internet application or video other than the initial state.

8. The computer-implemented method of claim 1 wherein the information in the request used to determine the one or more search terms associated with the linked-from web page comprises a URL associated with the linked-from web page.

9. The computer-implemented method of claim 8 wherein the information in the request is an HTTP referrer field in an HTTP header.

10. The computer-implemented method of claim 1 further comprising identifying web pages to recommend based at least in part on the one or more search terms, wherein the recommended web pages are other web pages that are part of a same website as the linked-to web page.

11. The computer-implemented method of claim 10 wherein determining content to provide as the linked-to web page using the one or more search terms comprises the identifying of web pages to recommend.

12. The computer-implemented method of claim 10 wherein recommended web pages are identified based at least in part on information about other searches involving similar search terms.

13. The computer-implemented method of claim 10 wherein recommended web pages are identified by tracking user interaction.

14. The computer-implemented method of claim 1 wherein the linked to web page comprises an HTML document, a pdf document, a rich Internet application, or a video.

15. The computer-implemented method of claim 1 further comprising identifying a correlation between a search term of the one or more search terms and ultimate purchase of a product or service offered through the website of which the linked-to web page is a part.

16. The computer-implemented method of claim 1 further comprising using the information in the request to determine that the linked-from web page was a search engine web page.

17. The computer-implemented method of claim 1 wherein the linked-from web page is provided a server device associated with a first website and the linked-to web page are provided by a second server device different from the first server device and associated with a second website different from the first website.

18. A system comprising a server, the server comprising:
   a module that receives one or more search terms and a search for web pages based on one or more search terms;
   a module that provides a linked-from web page with search results of the search, the linked-from web page comprising a link to a linked-to-web page corresponding to a result of the search;
   a module that receives a request to provide the linked-to web page, wherein receiving the request comprises receiving a user-initiated selection of the link, wherein the request comprises information from a linked-from web page;

a module that uses the information in the request to determine the one or more search terms associated with the linked-from web page and determines content to provide as the linked-to web pages using the one or more search terms, wherein the provided content varies depending on the one or more search terms, wherein the content comprises a search tool identifying the one or more search terms and a new search term different from the one or more search terms and the linked-to web page provides new search results based on a new search using the one or more search terms and the new search term; and a module that provides the linked-to web page in response to the request.

19. The system of claim 18 wherein the module that determines content to provide as the linked-to web page identifies the new search results to display in the linked-to web page, and wherein the linked-to web page comprises a search interface that displays the new search results in a search results listing and receives input to refine the new search.

20. A computer-readable storage medium on which is encoded program code, the program code comprising:

program code for receiving a request to provide a linked-to web page, wherein receiving the request comprises receiving a user-initiated selection of a link on a linked-from web page, wherein the linked-from web page comprises search results of a search based on one or more search terms, the linked-from web page comprising the link to the linked-to web page corresponding to a result of the search, wherein the request comprises information from the linked-from web page;

program code for using the information in the request to determine the one or more search terms associated with the linked-from web page;

program code for determining content to provide as the linked-to web page using the one or more search terms, wherein the provided content varies depending on the one or more search terms, wherein the content comprises a search tool identifying the one or more search terms and a new search term different from the one or more search terms and the linked-to web page provides new search results based on a new search using the one or more search terms and the new search term; and program code for providing the linked-to web page in response to the request.

21. The computer-readable medium of claim 20 wherein the program code for determining content to provide as the linked-to web page comprises program code that identifies the new search results to display in the linked-to web page, and wherein the linked-to web page comprises a search interface that displays the new search results in a search results listing and receives input to refine the new search.

* * * * *